N. JENKINS.
Machine for Dressing Stone, Wood, &c.

No. 218,179.    Patented Aug. 5, 1879.

WITNESSES:
W. C. Brookes
H. A. Johnstone.

INVENTOR:
Nicholas Jenkins
by his attorney

UNITED STATES PATENT OFFICE.

NICHOLAS JENKINS, OF NEW HAVEN, CONNECTICUT, ASSIGNOR, BY MESNE ASSIGNMENTS, TO STEPHEN K. STANTON AND BELA HUBBARD.

IMPROVEMENT IN MACHINES FOR DRESSING STONE, WOOD, &c.

Specification forming part of Letters Patent No. 218,179, dated August 5, 1879; application filed January 2, 1879.

*To all whom it may concern:*

Be it known that I, NICHOLAS JENKINS, of the city and county of New Haven, in the State of Connecticut, have invented certain new and useful Improvements relating to Machinery for Dressing or Paneling Stone, Wood, or other analogous material; and I do hereby declare that the following is a full, clear, and exact description thereof.

This invention relates to an improved clamping device capable of acting on all sides, and allowing for irregularities, as in clamping a rough stone, or irregular pieces of timber, or wood-work, or analogous material. It is adapted for holding the material in an inclined position for the production of tapering work, or work on which the cuts are desired to be made at an angle.

The following is a description of what I consider the best means of carrying out the invention.

The accompanying drawings form part of this specification.

Figure 1:
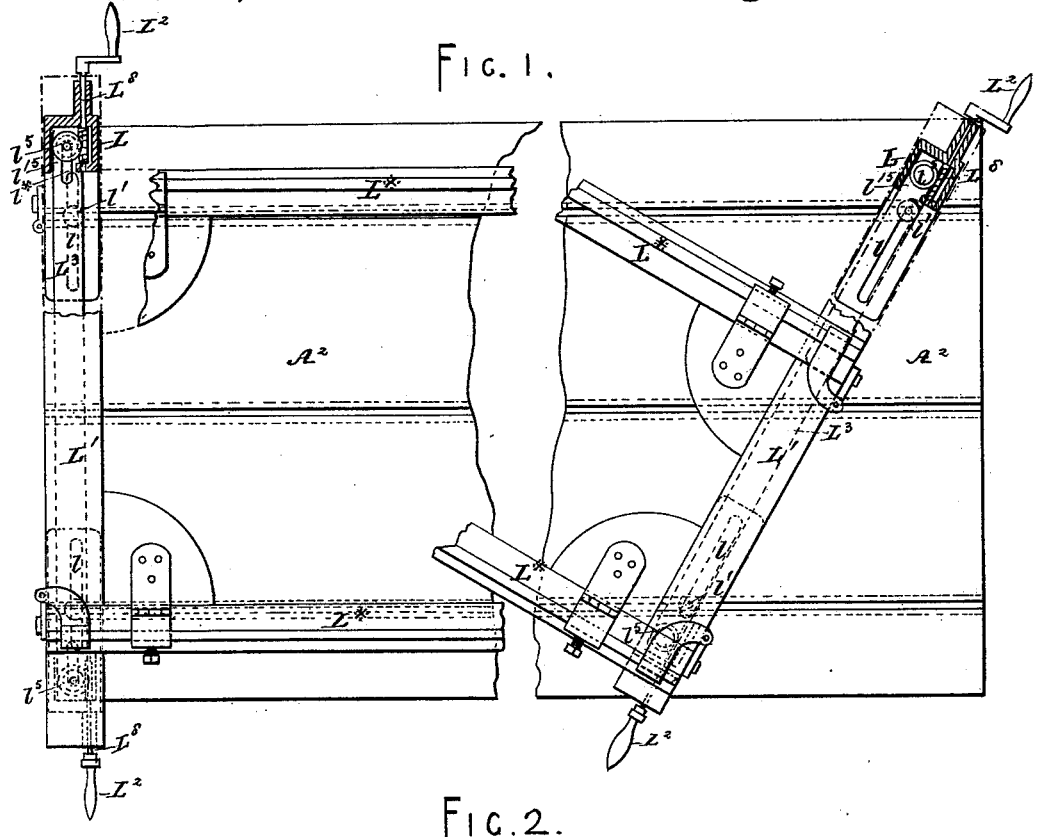
Figure 2:
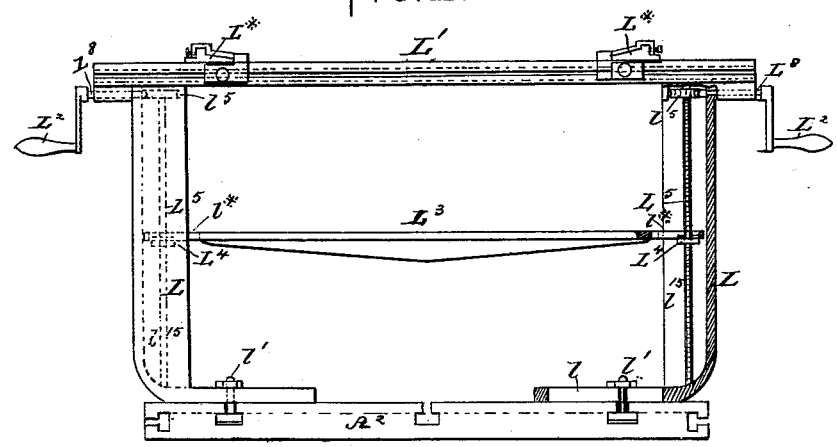

Figure 1 represents a plan view, and Fig. 2 an end view, both partly in section, of apparatus constructed according to my invention.

In each of the views similar letters of reference are employed to indicate corresponding parts wherever they occur.

L L are uprights secured to the carriage $A^2$ in any desired position by bolts $l^1$. $L^1$ is a cross-piece joining the uprights L. $L^2$ is a crank operating an endless-screw shaft, $L^8$, which lies just below the cross-piece $L^1$, which takes into a worm-wheel, $l^5$, on the upper end of an endless-screw shaft, $L^5$, which engages in nuts $L^4$. $L^3$ are longitudinal bars which are supported by the nuts $L^4$, and are set at the desired height by turning the screw-shaft $L^5$. These bars $L^3$ are of peculiar cross-section, as indicated plainly in Fig. 2.

The upright screw-shafts $L^5$ are mounted, by preference, within boxes $l^{15}$, formed in the uprights L, and they pass freely through the slots $l^*$ in the ends of the clamping-bars $L^3$, which, by turning the screws $L^5$, are raised. The screws $L^5$ are turned by the cranks $L^2$, carrying endless screws $L^8$, which engage with worm-wheels $l^5$ on the heads of the screws $L^5$.

A slab of stone or other material which is to be treated being introduced into the machine between the clamping-bar $L^3$ and the fixed cross-bar $L^1$, turning the screws $L^5$ elevates the bar $L^3$ and firmly clamps the stone, always with its upper face level. The nuts $L^4$, in which the screws $L^5$ engage, support the ends of the clamping-bar $L^6$, and the clamping-bars $L^3$, by reason of their slots $l^*$, are free to move sidewise to a reasonable extent, so that the clamping-bars $L^3$ may be inclined considerably in clamping a piece of stone or other material of irregular form or thickness. This clamping means is more especially adapted for treating wide thin material, as slabs of marble, slate, or analogous stone, or broad pieces of wood, or compound structures of wood, as doors. Whatever the material, and however operated, the upper face is certain to be even with the under side of the level cross-bars $L^1$.

A feature to which I attach especial importance in this part of the apparatus is its capacity for being adjusted not only to produce rectangular panels, when such are desired, but also panels and figures with various degrees of obliquity, such as required for the diamond shapes or rhomboidal parallelograms sometimes called for in the sides of straight stairs and in various architectural decorations of interiors. The joints above are all capable of being freely swiveled, and the feet of the posts or uprights L extend diagonally inward, and are formed with long slots $l$, as shown. This construction allows the posts L and their cross-bars $L^1$ and side pieces $L^*$ to be set angularly across the table $A^2$, or at right angles thereto, as shown by the two halves of Fig. 1, in which, on the left hand, the parts are shown parallel with the sides of the table, while on the right they are shown at an angle thereto. The uprights L are held to the table $A^2$ by means of bolts $l^1$, the heads of which are held in grooves in the table $A^2$, as shown.

The device is capable of serving as a guide, in connection, of course, with suitable cutting apparatus, for producing not only parallelograms, but also trapezoidal or irregular four-sided figures.

I claim as my invention—

1. The slotted uprights L, in combination with the slotted clamps $L^3$, slotted table $A^2$, and bolts $l^1$, adapted to serve as herein specified.

2. The slotted uprights L, in combination with the slotted table $A^2$ and clamping-bars or clamps $L^3$, adapted to serve in connection with suitable side bars $L^*$, substantially as and for the purposes herein specified.

3. The combination, with the slotted uprights L, cross-bars $L^1$, slotted clamps $L^3$, and nuts $L^4$, of the shafts $L^5$, worm-wheels $l^5$, screws $l^8$, and cranks $L^2$, substantially as described.

In testimony whereof I have hereunto set my hand this 22d day of June, 1878, in the presence of two subscribing witnesses.

NICHOLAS JENKINS.

Witnesses:
W. COLBORNE BROOKES,
CHAS. C. STETSON.